US011978415B2

(12) United States Patent
Han et al.

(10) Patent No.: US 11,978,415 B2
(45) Date of Patent: May 7, 2024

(54) DISPLAY APPARATUS AND CONTROL METHOD THEREOF

(71) Applicant: SAMSUNG ELECTRONICS CO., LTD., Suwon-si (KR)

(72) Inventors: Youngseok Han, Suwon-si (KR); Sunghwan Jang, Suwon-si (KR); Hyehyun Heo, Suwon-si (KR); Beomjoon Kim, Suwon-si (KR); Ubin Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/081,665

(22) Filed: Oct. 27, 2020

(65) Prior Publication Data

US 2021/0142749 A1 May 13, 2021

Related U.S. Application Data

(60) Provisional application No. 62/934,731, filed on Nov. 13, 2019.

(30) Foreign Application Priority Data

Mar. 25, 2020 (KR) ........................ 10-2020-0036146

(51) Int. Cl.
*G09G 3/36* (2006.01)

(52) U.S. Cl.
CPC ... *G09G 3/3611* (2013.01); *G09G 2320/0252* (2013.01); *G09G 2320/0673* (2013.01); *G09G 2354/00* (2013.01)

(58) Field of Classification Search
CPC ......... G09G 3/3611; G09G 2320/0252; G09G 2320/0673; G09G 2354/00;
(Continued)

(56) References Cited

U.S. PATENT DOCUMENTS 7,148,868 B2 * 12/2006 Lee ...................... G09G 3/3648 345/643
7,358,947 B2 * 4/2008 Lee ...................... G09G 3/2011 345/89

(Continued)

FOREIGN PATENT DOCUMENTS

CN 106170060 A 11/2016
EP 3 637 785 A1 4/2020

(Continued)

OTHER PUBLICATIONS

Communication dated Feb. 11, 2021 issued by the European Patent Office in European Application No. 20207022.3.

(Continued)

*Primary Examiner* — Michael J Jansen, II
(74) *Attorney, Agent, or Firm* — Sughrue Mion, PLLC

(57) ABSTRACT

A display apparatus is provided. The display apparatus includes: a communication interface including a circuit; a display panel configured to be selectively driven at any one of a plurality of frame rates; and a processor configured to: identify an input frame rate of a video, based on the video being received through the communication interface, adjust a setting value of the display panel so that the display panel operates at a frame rate among the plurality of frame rates that corresponds to the input frame rate, and control the display panel to output the received video, by driving the display panel at the frame rate corresponding to the input frame rate.

18 Claims, 12 Drawing Sheets

(58) Field of Classification Search
CPC ... G09G 2320/0613; G09G 2320/0285; G09G 2340/0435; G09G 2340/16; G09G 3/3648
See application file for complete search history.

(56) References Cited

U.S. PATENT DOCUMENTS

| | | | | |
|---|---|---|---|---|
| 7,656,374 | B2 * | 2/2010 | Shen | G09G 3/3648 345/98 |
| 7,667,679 | B2 * | 2/2010 | Park | G09G 3/3696 345/89 |
| 7,973,785 | B2 | 7/2011 | Lee et al. | |
| 8,223,176 | B2 * | 7/2012 | Jeon | G09G 3/3648 345/87 |
| 8,253,911 | B2 * | 8/2012 | Kimura | G02F 1/136213 349/48 |
| 8,638,359 | B2 * | 1/2014 | Kim | H04N 13/356 348/51 |
| 8,730,271 | B2 * | 5/2014 | Kim | G09G 3/3225 345/690 |
| 8,749,711 | B2 | 6/2014 | Um | |
| 9,275,601 | B2 * | 3/2016 | Kaburlasos | G09G 5/00 |
| 9,589,540 | B2 * | 3/2017 | Wu | G06F 3/1407 |
| 9,773,460 | B2 * | 9/2017 | Verbeure | G09G 3/3406 |
| 10,127,869 | B2 * | 11/2018 | Shin | G09G 3/3614 |
| 10,147,370 | B2 * | 12/2018 | Verbeure | G09G 3/3611 |
| 10,162,516 | B2 | 12/2018 | Kato et al. | |
| 10,376,786 | B2 | 8/2019 | Lee et al. | |
| 10,732,830 | B2 | 8/2020 | Kato et al. | |
| 11,068,088 | B2 * | 7/2021 | Tripathi | G09G 3/20 |
| 11,120,771 | B2 * | 9/2021 | Callway | G09G 5/10 |
| 2003/0179170 | A1 * | 9/2003 | Lee | G09G 3/3648 345/87 |
| 2004/0130559 | A1 * | 7/2004 | Lee | G09G 3/2011 345/690 |
| 2006/0044242 | A1 * | 3/2006 | Park | G09G 3/3696 345/89 |
| 2007/0268237 | A1 * | 11/2007 | Shen | G09G 3/3648 345/102 |
| 2008/0055229 | A1 * | 3/2008 | Shen | G09G 3/3648 345/102 |
| 2008/0094335 | A1 * | 4/2008 | Kim | G09G 3/3611 345/89 |
| 2008/0284929 | A1 * | 11/2008 | Kimura | G02F 1/136213 349/48 |
| 2010/0020112 | A1 * | 1/2010 | Jeon | G09G 3/3648 345/204 |
| 2010/0164937 | A1 * | 7/2010 | Kim | G09G 3/3225 345/212 |
| 2011/0090319 | A1 * | 4/2011 | Kim | H04N 13/341 348/51 |
| 2011/0205259 | A1 * | 8/2011 | Hagood, IV | G09G 3/3413 345/690 |
| 2013/0141642 | A1 * | 6/2013 | Wu | G09G 5/363 348/441 |
| 2014/0160136 | A1 * | 6/2014 | Kaburlasos | G09G 5/00 345/520 |
| 2014/0333516 | A1 * | 11/2014 | Park | G09G 3/3614 345/89 |
| 2015/0109286 | A1 * | 4/2015 | Verbeure | G09G 3/3406 345/545 |
| 2015/0146097 | A1 | 5/2015 | Izumi | |
| 2015/0172622 | A1 | 6/2015 | Yoon et al. | |
| 2016/0021328 | A1 * | 1/2016 | Shen | H04N 21/440281 348/448 |
| 2016/0342301 | A1 | 11/2016 | Kato et al. | |
| 2017/0053612 | A1 * | 2/2017 | Shin | G09G 3/3648 |
| 2017/0124934 | A1 * | 5/2017 | Verbeure | G09G 3/3611 |
| 2018/0054594 | A1 | 2/2018 | Tsai et al. | |
| 2019/0079667 | A1 | 3/2019 | Kato et al. | |
| 2020/0192500 | A1 * | 6/2020 | Tripathi | G09G 3/20 |
| 2020/0219463 | A1 * | 7/2020 | Callway | G09G 5/12 |
| 2021/0074237 | A1 * | 3/2021 | Spitzer | G09G 5/003 |
| 2021/0142749 | A1 * | 5/2021 | Han | G09G 3/3648 |
| 2021/0233481 | A1 | 7/2021 | Ryu et al. | |

FOREIGN PATENT DOCUMENTS

| | | | |
|---|---|---|---|
| JP | 2018-169455 | A | 11/2018 |
| KR | 100741764 | B1 | 7/2007 |
| KR | 1020080022276 | A | 3/2008 |
| KR | 1020080054517 | A | 6/2008 |
| KR | 10-2011-0071670 | A | 6/2011 |
| KR | 10-1544843 | B1 | 8/2015 |
| KR | 1020170076478 | A | 7/2017 |
| KR | 10-2019-0010129 | A | 1/2019 |
| KR | 10-2112146 | B1 | 5/2020 |
| KR | 10-2021-0142761 | A | 11/2021 |

OTHER PUBLICATIONS

International Search Report dated Feb. 15, 2021 issued by the International Searching Authority in International Application No. PCT/KR2020/015169 (PCT/ISA/210).

Written Opinion dated Feb. 15, 2021 issued by the International Searching Authority in International Application No. PCT/KR2020/015169 (PCT/ISA/237).

Communication dated May 12, 2021, issued by the European Patent Office in European Application No. 20207022.3.

Examination Report dated Feb. 3, 2023, issued by the European Patent Office for European Patent Application No. 20207022.3.

Communication dated Oct. 11, 2023 issued by the Korean Patent Office in counterpart Korean Application No. 10-2020-0036146.

CN Communication issued Jul. 27, 2023 by the Chinese Patent Office in CN Patent Application No. 202011267631.1.

Communication issued Mar. 8, 2024 by Chinese Patent Office in Chinese Patent Application No. 202011267631.1.

* cited by examiner

DISPLAY APPARATUS AND CONTROL METHOD THEREOF

CROSS-REFERENCE TO RELATED APPLICATION(S)

This application is based on and claims priority under 35 U.S.C. § 119 to Korean Patent Application No. 10-2020-0036146, filed on Mar. 25, 2020, in the Korean Intellectual Property Office, and claims the benefit of U.S. Provisional Application No. 62/934,731, filed on Nov. 13, 2019, in the U.S. Patent and Trademark Office, the disclosures of which are incorporated by reference herein in their entireties.

BACKGROUND

1. Field

The disclosure relates to a display apparatus and a control method thereof, and more particularly, to a display apparatus for changing a frame rate, and a control method thereof.

2. Description of Related Art

Recently, with the development of a technology for a display apparatus, a display apparatus having a high scan rate has been developed to improve video quality.

However, when a frame rate (or a scan rate) of a panel provided in the display apparatus is different from a frame rate of a video, a delay time may occur, and, thus, a problem may occur that a video that is originally intended to have an improved quality is lagged or is not seamless when the video is provided to a user.

For example, in the related art, when the frame rate of the video is low and the frame rate of the panel is relatively high, there is a problem that an input lag of about 8.3 ms is generated until the video is output after calculation for a frame configuring the video is performed.

SUMMARY

Provided are a display apparatus that changes a frame rate of a display panel and outputs a video, and a control method thereof.

According to embodiments, the display panel may be driven at the plurality of frame rates without changing a panel structure of the display apparatus.

According to embodiments, by allowing the frame rate of the video and the frame rate of the display panel to coincide, it is possible to minimize occurrence of an input lag and provide a video that is not lagged and is seamless to a user.

According to embodiments, it is possible to control whether or not to change the frame rate of the display panel according to a control command and control whether to output a video as it is or add an interpolation frame to the video and then output the video.

Additional aspects will be set forth in part in the description which follows and, in part, will be apparent from the description, or may be learned by practice of the presented embodiments of the disclosure.

In accordance with an aspect of the disclosure, a display apparatus includes: a communication interface including a circuit; a display panel configured to be selectively driven at any one of a plurality of frame rates; and a processor configured to: identify an input frame rate of a video, based on the video being received through the communication interface, adjust a setting value of the display panel so that the display panel operates at a frame rate among the plurality of frame rates that corresponds to the input frame rate, and control the display panel to output the received video, by driving the display panel at the frame rate corresponding to the input frame rate.

The processor is further configured to adjust at least one of a dynamic capacitance compensation (DCC) value for compensating for a response speed of the display panel, a liquid crystal charging timing of the display panel, or a luminance of the display panel, that are included in the setting value, based on the input frame rate.

The plurality of frame rates include a first frame rate and a second frame rate having a frequency higher than a frequency of the first frame rate, and the DCC value and the liquid crystal charging timing that are included in a setting value corresponding to the first frame rate are greater than the DCC value and the liquid crystal charging timing that are included in a setting value corresponding to the second frame rate.

The plurality of frame rates include a first frame rate and a second frame rate having a frequency higher than a frequency of the first frame rate, and the processor is further configured to: identify the input frame rate as corresponding to the second frame rate, increase the DCC value and the liquid crystal charging timing based on a setting value corresponding to the first frame rate, based on the frame rate of the display panel being changed from the second frame rate to the first frame rate, and adjust the luminance of the display panel so that a gamma value of the display panel is maintained equal to a reference gamma value.

The processor is further configured to: change a frame rate of the display panel based on a user command for changing the frame rate of the display panel, and drive the display panel, based on the user command.

The processor is further configured to: control the display panel to display a user interface (UI) for changing the frame rate of the display panel, and adjust the setting value of the display panel so that the display panel operates at a frame rate corresponding to the user command input through the UI.

The processor is further configured to identify the input frame rate of the received video based on metadata of the received video.

The processor is further configured to: analyze the received video to obtain video processing delay information related to processing of the received video, and identify the input frame rate of the received video based on the video processing delay information.

The video processing delay information is determined based on at least one of type information of the received video, user interaction related information, or object information in the received video.

In accordance with an aspect of the disclosure, a control method of a display apparatus including a display panel configured to be selectively driven at any one of a plurality of frame rates includes: identifying an input frame rate of a video, based on the video being received; adjusting a setting value of the display panel so that the display panel operates at a frame rate among the plurality of frame rates that corresponds to the input frame rate; and controlling the display panel to output the received video, by driving the display panel at the frame rate corresponding to the input frame rate.

The adjusting the setting value includes adjusting at least one of a dynamic capacitance compensation (DCC) value for compensating for a response speed of the display panel, a liquid crystal charging timing of the display panel, or a luminance of the display panel, that are included in the setting value, based on the input frame rate.

The plurality of frame rates include a first frame rate and a second frame rate having a frequency higher than a frequency of the first frame rate, and the DCC value and the liquid crystal charging timing that are included in a setting value corresponding to the first frame rate are greater than the DCC value and the liquid crystal charging timing that are included in a setting value corresponding to the second frame rate.

The plurality of frame rates include a first frame rate and a second frame rate having a frequency higher than a frequency of the first frame rate, the identifying the input frame rate includes identifying the input frame rate as corresponding to the second frame rate, and the adjusting the setting value includes: increasing the DCC value and the liquid crystal charging timing based on a setting value corresponding to the first frame rate, based on the frame rate of the display panel being changed from the second frame rate to the first frame rate; and adjusting the luminance of the display panel so that a gamma value of the display panel is maintained to be equal to a reference gamma value.

The adjusting the setting value includes changing a frame rate of the display panel based on receiving a user command for changing the frame rate of the display panel.

The control method may further include displaying a user interface (UI) for changing the frame rate of the display panel, wherein the adjusting the setting value includes adjusting the setting value of the display panel so that the display panel operates at a frame rate corresponding to the user command input through the UI.

The identifying the input frame rate of the video includes identifying the input frame rate of the received video based on metadata of the received video.

The control method may further include analyzing the received video to obtain video processing delay information related to processing of the received video, wherein the identifying the input frame rate of the video includes identifying the input frame rate of the received video based on the video processing delay information.

The video processing delay information is determined based on at least one of type information of the received video, user interaction related information, or object information in the received video.

In accordance with an aspect of the disclosure, there is provided a non-transitory computer-readable medium storing at least one instruction that, based on being executed by a processor of a display apparatus, causes the display apparatus to perform a method of: identifying an input frame rate of a video, based on the video being received; adjusting a setting value of a display panel so that the display panel, which is capable of being selectively driven at any one of a plurality of frame rates, operates at a frame rate among the plurality of frame rates that corresponds to the input frame rate; and controlling the display panel to output the received video by driving the display panel at the frame rate corresponding to the input frame rate.

In accordance with an aspect of the disclosure, a display apparatus includes: a panel driver; a display panel which is drivable by the panel driver at a plurality of frame rates and is configured to display content at any one of the plurality of frame rates; and a processor configured to: identify an input frame rate of a video being received by the display apparatus based on a parameter included in the video, the input frame rate being different from a second frame rate of the display panel at which content has been previously displayed, among the plurality of frame rates, based on the input frame rate being different, adjust a response speed setting value of the display panel so that the display panel starts operating at a first frame rate among the plurality of frame rates that corresponds to the input frame rate, and control the display panel to output the received video, by controlling the panel driver to drive the display panel at the first frame rate corresponding to the input frame rate.

The second frame rate has a frequency higher than a frequency of the first frame rate, the response speed setting value is set differently for the first frame rate and the second frame rate, and the processor is further configured to: based on the second frame rate being changed to the first frame rate, increase the response speed setting value in correspondence to the first frame rate, and adjust a luminance of the display panel so that a gamma value of the display panel remains at a constant level.

The processor is further configured to: based on the first frame rate being changed to the second frame rate, decrease the response speed setting value in correspondence to the second frame rate.

The processor is further configured to adjust the response speed setting value of the display panel by adjusting at least one of a dynamic capacitance compensation (DCC) value for compensating for a response speed of the display panel or a liquid crystal charging timing of the display panel.

BRIEF DESCRIPTION OF THE DRAWINGS

The above and other aspects, features, and advantages of certain embodiments of the present disclosure will be more apparent from the following description taken in conjunction with the accompanying drawings, in which.

and

Figure 10:
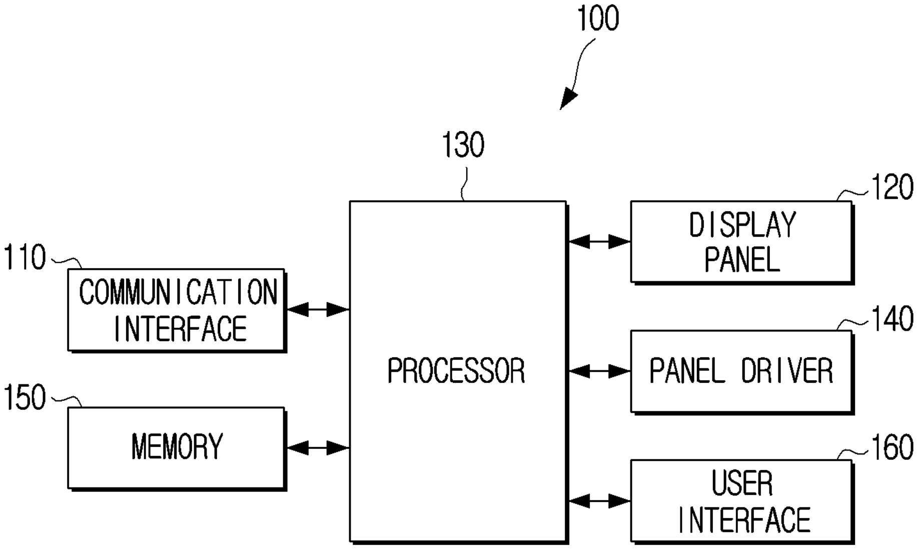

FIG. 10 is a block diagram illustrating components of the display apparatus according to an embodiment.

DETAILED DESCRIPTION

Certain embodiments will be described in detail with reference to the accompanying drawings.

General terms that are currently widely used were selected as terms used in embodiments in consideration of functions, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion. Therefore, the terms used in embodiments are to be defined based on the meaning of the terms and the contents throughout the description rather than simple names of the terms.

As used herein, an expression "have", "may have", "include", "may include", or the like, may indicate existence of a corresponding feature (for example, a numerical value, a function, an operation, a component such as a part, or the like), and does not exclude existence of an additional feature.

An expression "at least one of A and/or B" is to be understood to represent "A" or "B" or "any one of A and B".

As used herein, the terms "1st" or "first", "2nd" or "second", or the like, may use corresponding components regardless of importance or order and are used to distinguish one component from another, without limiting the components.

When it is mentioned that any component (for example, a first component) is (operatively or communicatively) coupled with/to or is connected to another component (for example, a second component), it is to be understood that any component is directly coupled to another component or may be coupled to another component through the other component (for example, a third component).

Singular forms are intended to include plural forms unless the context clearly indicates otherwise. It will be further understood that terms "include" or "formed of" used herein specify the presence of features, numerals, steps, operations, components, parts, or combinations thereof, but do not preclude the presence or addition of one or more other features, numerals, steps, operations, components, parts, or combinations thereof.

As used herein, a "module" or a "~er/or" may perform at least one function or operation, and be implemented by hardware or software or be implemented by a combination of hardware and software. In addition, a plurality of "modules" or a plurality of "~ers/~ors" may be integrated in at least one module and be implemented by at least one processor except for a "module" or a "~er/or" that needs to be implemented by specific hardware.

As used herein, a term "user" may refer to a person using an electronic apparatus or an apparatus (for example, an artificial intelligence electronic apparatus) using an electronic apparatus.

Hereinafter, an embodiment will be described in detail with reference to the accompanying drawings.

Figure 1:
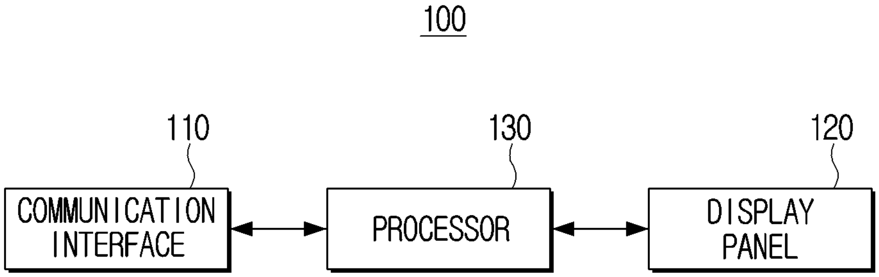
FIG. 1 is a schematic block diagram illustrating components of a display apparatus according to an embodiment.

FIG. 1 is a schematic block diagram illustrating components of a display apparatus according to an embodiment.

As illustrated in FIG. 1, a display apparatus 100 according to an embodiment includes a communication interface 110, a display panel 120, and a processor 130.

Here, the display apparatus 100 displays video data. The display apparatus 100 may be implemented by a television (TV), but is not limited thereto, and may be any apparatus having a display function, such as a video wall, a large format display (LFD), a digital signage, a digital information display (DID), a projector display, or the like. The display apparatus 100 may be implemented by displays having various forms such as a liquid crystal display (LCD), an organic light emitting diode (OLED), a liquid crystal on silicon (LCoS), a digital light processing (DLP), a quantum dot (QD) display panel, a quantum dot LED (QLED), a micro LED (μLED), a mini LED, and the like. Meanwhile, the display apparatus 100 may also be implemented by a touch screen combined with a touch sensor, a flexible display, a rollable display, a three-dimensional (3D) display, and a display in which a plurality of display modules are physically connected to each other, or the like.

The communication interface 110 including a circuit according to an embodiment receives various types of videos. For example, the communication interface 110 may receive a video signal in a streaming or download manner from an external apparatus (for example, a source apparatus), an external storage medium (for example, a universal serial bus (USB) memory), an external server (for example, a Web hard), or the like, through a communication manner such as access point (AP)-based Wi-Fi (Wireless local area network (LAN)), Bluetooth, Zigbee, wired/wireless LAN, wide area network (WAN), Ethernet, IEEE 1394, high-definition multimedia interface (HDMI), USB, mobile high-definition link (MHL), audio engineering society/European broadcasting union (AES/EBU), an optical manner, a coaxial manner, or the like. Here, the video signal may be any one digital video signal of a standard definition (SD), high definition (HD), full HD, or ultra HD video, but is not limited thereto.

Particularly, the communication interface 110 according to an embodiment may receive a video from the external apparatus. For example, the display apparatus 100 may sequentially receive a plurality of video frames configuring a video through the communication interface 110.

However, this is an example, embodiments are not limited thereto. As an example, the display apparatus 100 may store a video received through the communication interface 110 in a memory, load the video from the memory, and provide the video through the display panel 120. As another example, the display apparatus 100 may load a video pre-stored in the memory and provide the video through the display panel 120.

The display panel 120 according to an embodiment may be selectively driven at any one of a plurality of frame rates. Here, the frame rate may refer to a speed at which the display apparatus 100 displays one frame. The frame rate of the display panel 120 may be referred to as a refresh rate, a frequency, or a scan rate, but hereinafter, will be referred to as a frame rate for convenience of explanation. The frame rate of the display panel 120 may be represented by Hz. As an example, when the frame rate of the display panel 120 is 60 Hz, the display panel 120 may provide 60 frames per second. As another example, when the frame rate of the display panel 120 is 120 Hz, the display panel 120 may provide 120 frames per second. Here, an example in which the display panel 120 is driven at the frame rate of 60 Hz or 120 Hz is only an example, embodiments are not limited thereto. For example, the display panel 120 may be driven at various frame rates such as 75 Hz, 144 Hz, and 240 Hz.

The display panel 120 according to an embodiment may be driven at any one of the plurality of frame rates according to the control of the processor 130. Hereinafter, embodiments in which the processor 130 selects any one of the plurality of frame rates, drives the display panel 120 at the selected frame rate, and outputs a video received through the communication interface 110 will be described.

The processor 130 controls a general operation of the display apparatus 100.

According to an embodiment, the processor 130 may be implemented by a digital signal processor (DSP), a microprocessor, an artificial intelligence (AI) processor, or a time controller (T-CON) processing a digital video signal. However, the processor 130 is not limited thereto, but may include one or more of a central processing unit (CPU), a micro controller unit (MCU), a micro processing unit (MPU), a controller, an application processor (AP), a communication processor (CP), and an ARM processor, or may be defined by these terms. In addition, the processor 130 may be implemented by a system-on-chip (SoC) or a large scale integration (LSI) in which a processing algorithm is embedded or may be implemented in a field programmable gate array (FPGA) form.

When the video is received through the communication interface 110, the processor 130 according to an embodiment may identify a frame rate of the received video.

As an example, the video (for example, a moving picture) is a set of temporally continuous still images, and one still image may be a frame. The frame rate of the video may be represented by frames per second (fps). That is, the frame rate of the video may refer to the number of frames configuring the video for 1 second. The frame rate of the video may be referred to as a frame speed and a frame ratio, but hereinafter, will be referred to as a frame rate for convenience of explanation.

For example, if a video of at least 24 fps or more is provided, a user may determine that the video is a smooth and seamless video. Generally, as the frame rate of the video increases, the user feels that the smooth and seamless video is provided, but is not limited thereto.

The display apparatus 100 according to an embodiment may receive and display videos of various frame rates such as 60 fps, 120 fps, 1000 fps, and the like, such as a game video (for example, a first-person shooter (FPS) game, a racing game), a sports video, and a slow motion video.

When the video is received through the communication interface 110, the processor 130 according to an embodiment may identify the frame rate of the received video. As an example, the processor 130 may identify the frame rate of the video (for example, fps of the video) based on metadata of the received video. Meanwhile, a configuration in which the processor 130 identifies the frame rate of the video based on the metadata of the video is only an example, and the disclosure is not necessarily limited thereto. As an example, the processor 130 may also identify the frame rate of the video based on the number of frames configuring the video for 1 second among a plurality of frames configuring the video.

Then, in a case where the processor 130 drives the display panel 120 at a frame rate corresponding the frame rate identified based on the received video, the processor 130 may adjust a setting value of the display panel so that the display panel operates at the frame rate (that is, the identified frame rate) of the video among the plurality of frame rates at which that the display panel 120 may be driven. As an example, when the frame rate of the video is 60 fps, the processor 130 may adjust the setting value of the display panel 120 so that the display panel 120 operates at 60 Hz corresponding to 60 fps. As another example, when the frame rate of the video is 120 fps, the processor 130 may adjust the setting value of the display panel 120 so that the display panel 120 operates at 120 Hz corresponding to 120 fps.

Here, the frame rate (for example, fps unit) of the video may refer to the number of frames configuring the video for 1 second, and the frame rate (for example, Hz unit) of the display panel 120 may refer to the number of frames provided by the panel 120 for 1 second.

As an example, when the frame rate of the video is lower than that of the display panel 120, some of the frames of the video of the display panel 120 are repeatedly displayed, and thus, there is a problem that the video appears slow to the user.

As another example, when the frame rate of the video is higher than that of the display panel 120, several new frames are generated before the display panel 120 displays the next frame, and a problem that some frames are lost or are not displayed may thus occur.

When the frame rate of the video is much higher than that of the display panel 120, the next frame is input in a cycle in which the display panel 120 has displayed a specific frame, such that screen tearing in which different frames are displayed on upper and lower portions of a screen may occur. Therefore, the display apparatus 100 according to an embodiment may perform vertical synchronization (V-sync) for setting a frame generation timing of the video and a frame output timing of the display panel 120 to be synchronized.

On the other hand, a display apparatus 100 according to the related art performs a process in which a frame passes through a vertical synchronization buffer to synchronize a generation timing of a frame configuring an input video and a frame output timing of the display panel 120, and has a problem that a delay time is generated in such a process. As a result, there was a problem that a delay occurs between input and output of the video.

For example, assuming that the received video is a 60 fps video, the processor 130 may perform calculation on the received video while waiting for vertical synchronization in units of 1/60 s (16.6 ms). When the display panel 120 operates at a frame rate of 120 Hz, there is a problem that a delay of at least 8.3 ms (16.6 ms/2) occurs until the processor 130 performs calculation on the received video and outputs the video through the display panel 120. The delay may be referred to as a latency, an input lag, a display lag, and the like.

The processor 130 according to an embodiment may adjust the setting value of the display panel 120 so that the display panel 120 operates at a frame rate (for example, a scan rate) corresponding to the frame rate of the video. Then, the processor 130 may control the display panel 120 to output the received video. In this case, the delay occurrence between video outputs may be minimized.

A detailed description therefor will be provided with reference to FIGS. 2A to 3B.

Figure 2A:
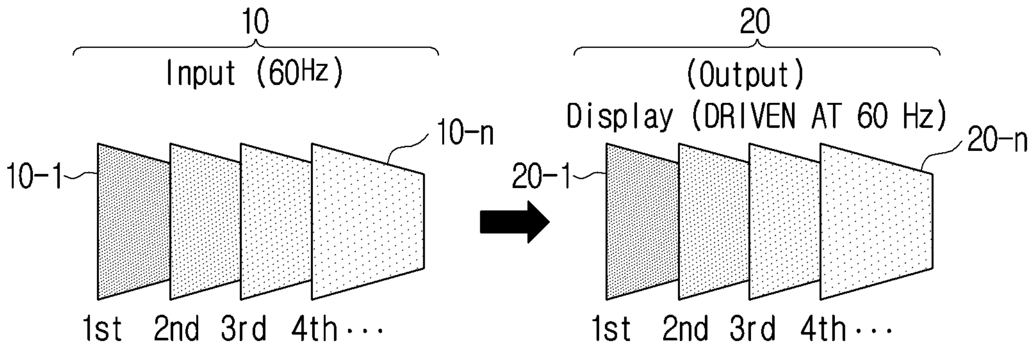
FIGS. 2A and 2B are views illustrating a frame rate of a display panel according to an embodiment.
Figure 2B:
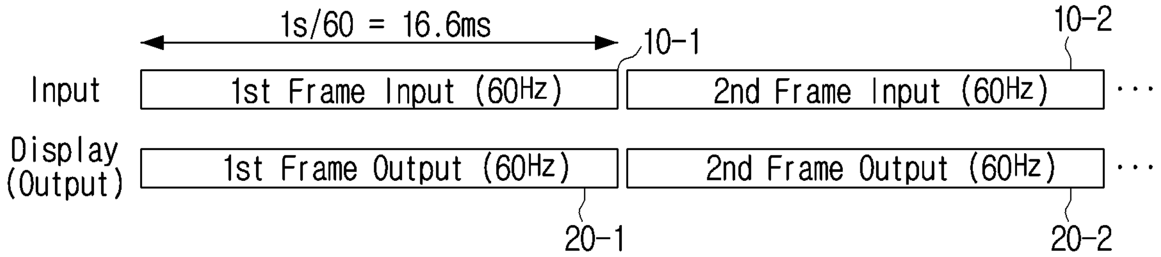

FIGS. 2A and 2B are views illustrating a frame rate of a display panel according to an embodiment.

Referring to FIGS. 2A and 2B, according to an embodiment, the processor 130 identifies a frame rate of a received video 10 including a first frame 10-1 and second to n-th frames 10-2 to **10-*n*, e.g., the processor 130 identifies an input frame rate of the input frames. When the frame rate of the received video 10 is a first frame rate, the processor 130 may adjust a setting value of the display panel 120 to output an output video 20 so that the display panel 120 operates at a frame rate (for example, a scan rate) corresponding to the first frame rate. The output video 20 may include a first output frame 20-1 and second to n-th output frames 20-2 to 20-*n* which correspond to the input frames of the received video 10**.

For example, the processor 130 may adjust at least one of a DCC value for compensating for a response speed of the display panel 120 or a liquid crystal charging timing or luminance of the display panel 120, included in the setting value, based on the identified first frame rate.

Here, DCC is a method of comparing a gradation value of a previous frame with a gradation value of a current frame for an arbitrary pixel and performing processing of RGB data so that a value greater than a difference between these gradation values is added to the gradation value of the previous frame. Generally, a delay (for example, a duration) of one frame is 16.7 ms. When a voltage is applied across a liquid crystal material in an arbitrary pixel, it takes time for the liquid crystal material to respond to the voltage. Therefore, a time delay is inevitable to represent an intended gradation value. A DCC function is a technology for minimizing this time delay. For example, when the gradation value in the previous frame is '118' and the gradation value in the current frame is '128' for the arbitrary pixel, a value obtained by adding a value (referred to as a compensation value) greater than '10', which is a difference between two gradation values, to the gradation value in the previous frame, for example, '135' is converted as the gradation value of the current frame. In this DCC method, a frame memory for storing data of the previous frame is required, and the compensation value may be determined by a look-up table created based on the data of the previous frame and data of the current frame. The processor 130 may also obtain the DCC value based on various equations for calculating the compensation value, in addition to the lookup table.

Then, the processor 130 may adjust the setting value of the display panel 120 according to the obtained DCC value to operate the display panel 120 at a specific frame rate.

Referring to FIGS. 2A and 2B, when the frame rate of the received video 10 is 60 fps, the processor 130 may operate the display panel 120 at a frame rate (for example, a scan rate) of 60 Hz corresponding to 60 fps. In this case, a first output frame 20-1 corresponding to a first frame 10-1 configuring the input video may be obtained without a delay (for example, about 16.6 ms) required for calculation of the first frame 10-1.

Figure 3A:
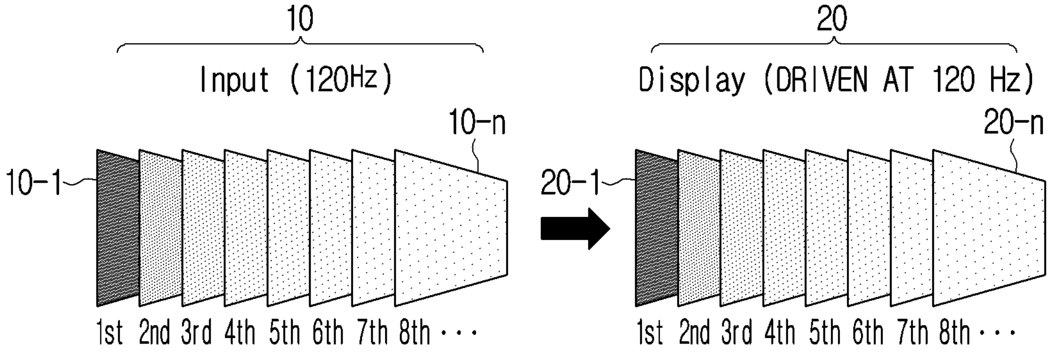
FIGS. 3A and 3B are views illustrating a frame rate of a display panel according to an embodiment.
Figure 3B:
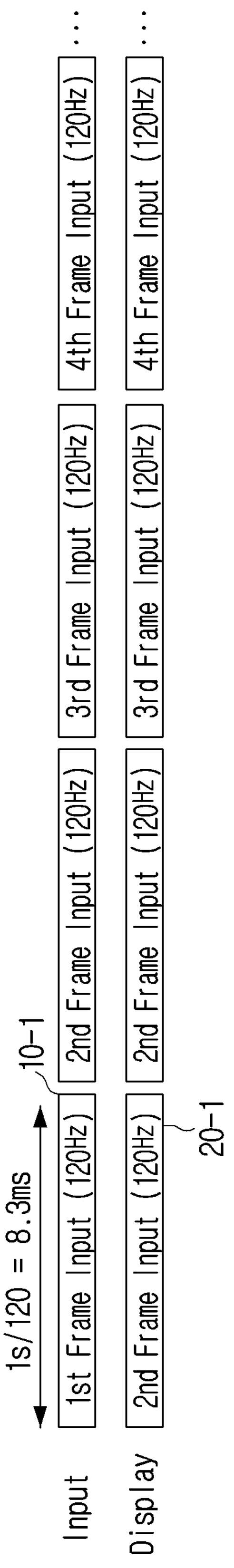

FIGS. 3A and 3B are views illustrating a frame rate of a display panel according to an embodiment.

Referring to FIGS. 3A and 3B, according to an embodiment, the processor 130 identifies a frame rate of a received video 10. When the frame rate of the received video 10 is a second frame rate, the processor 130 may adjust a setting value of the display panel 120 so that the display panel 120 operates at a frame rate (for example, a scan rate) corresponding to the second frame rate. According to an embodiment, the second frame rate may be a frame rate having a frequency higher than that of the first frame rate. For example, the first frame rate may be 60 Hz (or 60 fps), and the second frame rate may be 120 Hz (or 120 fps).

Then, the processor 130 may adjust at least one of a DCC value for compensating for a response speed of the display panel 120 or a liquid crystal charging timing or luminance of the display panel 120, included in the setting value, based on the identified second frame rate.

Referring to FIGS. 3A and 3B, when the frame rate of the received video 10 is 120 fps, the processor 130 may operate the display panel 120 at a frame rate (for example, a scan rate) of 120 Hz corresponding to 120 fps. In this case, a first output frame 20-1 corresponding to a first frame 10-1 configuring the input video may be obtained without a delay (for example, about 8.3 ms (1 s/120) required for calculation of the first frame 10-1. That is, the processor 130 may provide an output video 20 corresponding to the received video 10 through the display panel 120 without a delay time required for calculation or vertical synchronization for the received video 10.

According to an embodiment, the DCC value and the liquid crystal charging timing included in the setting value corresponding to the first frame rate (for example, 60 Hz) may be greater than the DCC value and the liquid crystal charging timing included in the setting value corresponding to the second frame rate (for example, 120 Hz).

For example, in a case where the display panel 120 is driven at a frame rate of 120 Hz, 120 frames need to be provided for 1 second, and the DCC value and the liquid crystal charging timing for compensating for a response speed may thus be reduced as compared with a case where the display panel 120 is driven at a frame rate of 60 Hz.

Then, the processor 130 may adjust the setting value of the display panel 120 according to the obtained DCC value to operate the display panel 120 at a specific frame rate.

The processor 130 according to an embodiment may adjust the luminance of the display panel 120 so that a gamma value of the display panel 120 is maintained as a reference gamma value even though the frame rate of the display panel 120 is changed.

For example, when the frame rate identified according to the received video 10 is changed from the second frame rate (for example, 120 Hz) to the first frame rate (for example, 60 Hz), the processor 130 may drive the display panel 120 at the first frame rate by increasing at least one of the DCC value or the liquid crystal charging timing based on the setting value corresponding to the frame rate. Then, the processor 130 may adjust the luminance or brightness of the display panel 120 so that a changed gamma value is maintained as the reference gamma value (for example, 2.2 gamma value) as at least one of the DCC value or the liquid crystal charging timing is increased.

Figure 4:
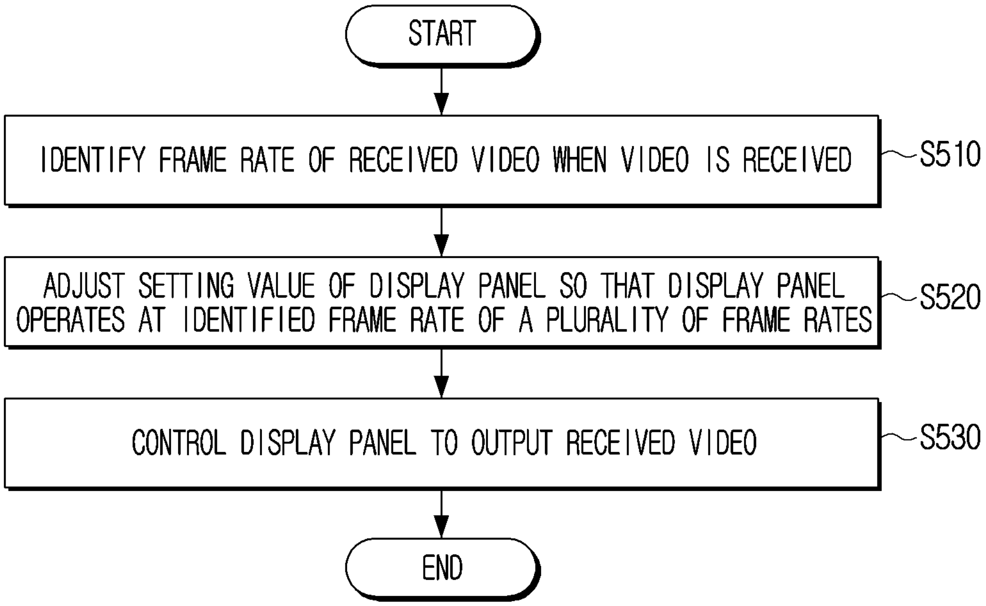
FIG. 4 is a flowchart of a control method of a display apparatus according to an embodiment.

FIG. 4 is a flowchart of a control method of a display apparatus according to an embodiment.

Referring to FIG. 4, in a control method of a display apparatus including a display panel that may be driven at a plurality of frame rates, when a video is received, a frame rate of the received video is identified (operation S510).

Then, the setting value of the display panel is adjusted so that the display panel operates at the identified frame rate of the plurality of frame rates (operation S520).

Then, the display panel is controlled to output the received video (operation S530).

Operation S520 of adjusting the setting value according to an embodiment may include adjusting at least one of a DCC value for compensating for a response speed of the display panel or a liquid crystal charging timing or luminance of the display panel, included in the setting value, based on the identified frame rate.

Here, the plurality of frame rates may include a first frame rate and a second frame rate having a frequency higher than that of the first frame rate, and a DCC value and a liquid crystal charging timing included in a setting value corresponding to the first frame rate may be greater than a DCC value and a liquid crystal charging timing included in a setting value corresponding to the second frame rate.

The plurality of frame rates may include a first frame rate and a second frame rate having a frequency higher than that of the first frame rate, and operation S520 of adjusting the setting value may include increasing the DCC value and the liquid crystal charging timing based on the setting value corresponding to the first frame rate when the identified frame rate is changed from the second frame rate to the first frame rate, and adjusting the luminance of the display panel so that a gamma value of the display panel is maintained as a reference gamma value.

In addition, the control method according to an embodiment may further include identifying whether or not to change the frame rate of the display panel based on a user command and operation S530 of controlling the display panel may include controlling the display panel to output the adjusted video by adjusting the frame configuring the received video when the user command is a command to fix the frame rate of the display panel and the identified frame rate corresponding to the received video and the fixed frame rate of the display panel that are different from each other.

The plurality of frame rates may include a first frame rate and a second frame rate having a frequency higher than that of the first frame rate, and operation S530 of controlling the display panel may include generating a new frame between a plurality of frames configuring the received video when the identified frame rate is the first frame rate and the fixed frame rate is the second frame rate, and controlling the display panel to output an adjusted video corresponding to the received video including the plurality of frames and the new frame.

In addition, the new frame may include at least one of a frame generated by repeating each of the plurality of frames configuring the received video or a frame generated based on at least two frames of the plurality of frames configuring the received video.

Here, the frame generated based on at least two frames of the plurality of frames configuring the received video may be a frame generated based on motion information of an object included in at least two frames.

In addition, the control method according to an embodiment may further include identifying whether or not to change the frame rate of the display panel based on a user command for controlling whether or not to change the frame rate of the display panel when the user command is received, and operation S520 of adjusting the setting value of the display panel may include changing the frame rate to the identified frame rate when the user command is a command to change the frame rate of the display panel and the identified frame rate corresponding to the received video and the frame rate of the display panel that are different from each other.

In addition, operation S520 of adjusting the setting value of the display panel may include changing the frame rate of the display panel based on a user command for changing the frame rate of the display panel when the user command is received.

The control method according to an embodiment may further include displaying a user interface (UI) for changing the frame rate of the display panel, and operation S520 of adjusting the setting value of the display panel may include adjusting the setting value of the display panel so that the display panel operates at a frame rate corresponding to a user command input through the UI.

In addition, operation S510 of identifying the frame rate of the received video may include identifying the frame rate of the received video based on the metadata of the received video, and operation S520 of adjusting the setting value of the display panel may include adjusting the setting value of the display panel so that the display panel operates at the identified frame rate.

In addition, the control method according to an embodiment may further include analyzing the received video to obtain video processing delay information related to processing of the received video, operation S510 of identifying the frame rate of the received video may further include identifying the frame rate of the received video based on the video processing delay information, and operation S520 of adjusting the setting value of the display panel may further include adjusting the setting value of the display panel so that the display panel operates at the identified frame rate.

Meanwhile, the identifying of whether or not to change the frame rate of the display panel 120 based on the user command will hereinafter be described with reference to FIGS. 5 and 6.

Figure 5:
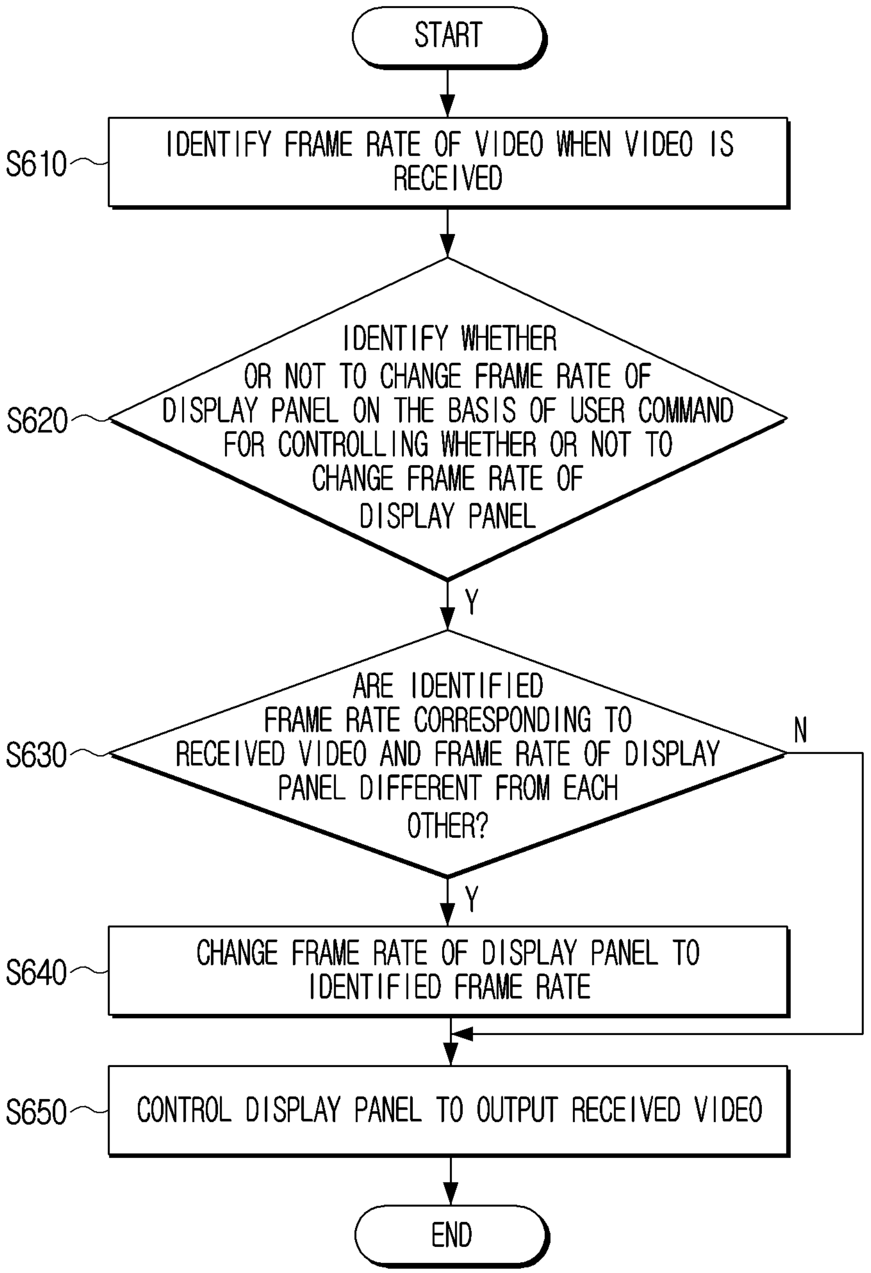
FIG. 5 is a view illustrating changing a frame rate according to an embodiment.

FIG. 5 is a view illustrating changing a frame rate according to an embodiment.

Referring to FIG. 5, the processor 130 according to an embodiment identifies the frame rate of the video (for example, fps of the video) (operation S610) when the video is received.

Then, the processor 130 identifies whether or not to change the frame rate of the display panel 120 based on the user command for controlling whether or not to change the frame rate of the display panel 120 (operation S620).

When the user command is a command to change the frame rate (operation S620: Y), the processor 130 identifies whether or not the identified frame rate corresponding to the received video and the frame rate of the display panel 120 are different from each other (operation S630).

Then, when the identified frame rate corresponding to the received video and the frame rate of the display panel 120 are different from each other (operation S630: Y), the processor 130 may change the frame rate of the display panel 120 to the identified frame rate (operation S640). Then, the processor 130 controls the display panel 120 to output the received video (operation S650).

As another example, when the identified frame rate corresponding to the received video and the frame rate of the display panel 120 are the same (operation S630: N), the processor 130 controls the display panel to output the received video (operation S650). That is, the processor 130 may control the display panel 120 to output the received video without changing the frame rate of the display panel 120.

According to an embodiment, the processor 130 may also identify whether to change the frame rate of the display panel 120 and then output the video or to generate a new frame (for example, an interpolation frame) in the video to adjust the frame rate of the video to correspond to the frame rate of the display panel 120, and then output an adjusted video, based on metadata corresponding to the video, in addition to the user command.

As an example, the processor 130 may identify the frame rate of the received video based on the metadata of the received video. For example, the metadata may include information on whether the frame rate of the video corresponds to 60 Hz, 120 Hz, or 144 Hz. The processor 130 may adjust the setting value of the display panel 120 to operate the display panel 120 at the frame rate identified based on the metadata.

As another example, the metadata may include information on whether or not to change the frame rate of the display panel 120 to coincide with the frame rate of the video and then output the corresponding video. For example, the processor 130 may change the frame rate of the display panel 120 to coincide with the frame rate of the video based on the information included in the metadata, and then output the corresponding video. As another example, the processor 130 may generate a new frame (for example, an interpolation frame) in the video to adjust the frame rate of the video to correspond to the frame rate of the display panel 120, and then output the adjusted video, without changing the frame rate of the display panel 120, based on the information included in the metadata.

According to an embodiment, when the user command for changing the frame rate of the display panel 120 is received, the processor 130 may change the frame rate of the display panel 120 based on the user command.

This will be described in detail with reference to FIG. 6.

Figure 6:
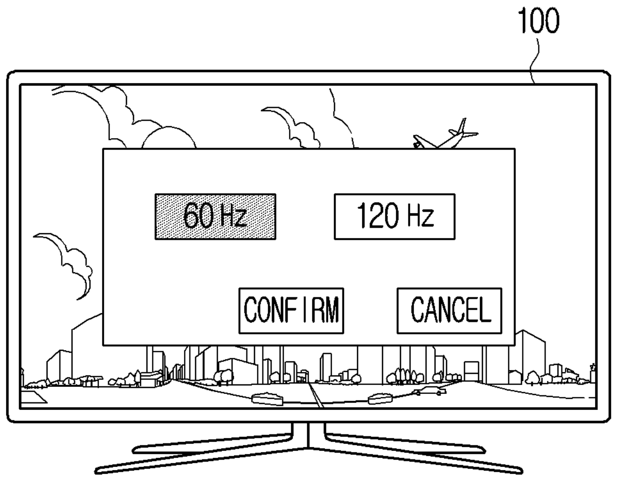
FIG. 6 is a view illustrating a UI according to an embodiment.

FIG. 6 is a view illustrating a UI according to an embodiment.

The processor 130 according to an embodiment identifies the frame rate of the video (for example, fps of the video) when the video is received.

Then, the processor 130 may identify the frame rate corresponding to the user command for changing the frame rate of the display panel 120. Then, the processor 130 may change the frame rate of the display panel 120.

As an example, the processor 130 may display a UI for changing the frame rate of the display panel 120. Referring to FIG. 6, the processor 130 may control the display panel 120 to display a UI through which each of a plurality of frame rates at which the display panel 120 may be driven may be selected.

When a user command for selecting one of the plurality of frame rates is received, the processor 130 may identify a frame rate corresponding to the user command. Then, the processor 130 may adjust a setting value of the display panel so that the display panel operates at a frame rate corresponding to the user command input through the UI.

FIG. 6 illustrates 60 Hz and 120 Hz as an example of the plurality of frame rates for convenience of explanation, but the plurality of frame rates are not limited thereto.

Figure 7:
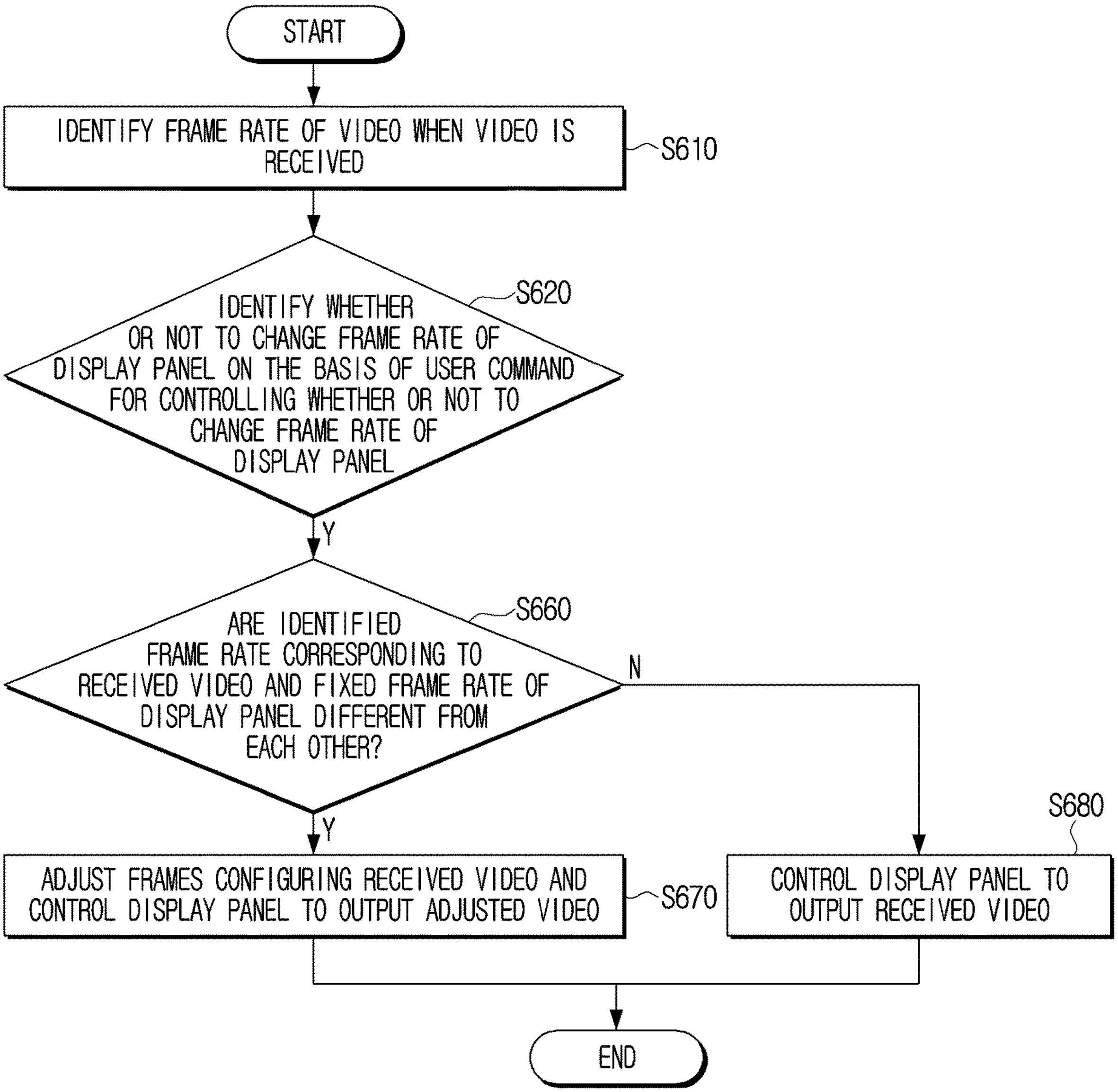
FIG. 7 is a view illustrating fixing a frame rate according to an embodiment.

FIG. 7 is a view illustrating fixing a frame rate according to an embodiment.

Referring to FIG. 7, as described above with reference to FIG. 5, in operation S620, when the user command regarding a change of the frame rate is received, the processor 130 identifies whether or not to change the frame rate of the display panel 120 based on the user command. When the user command is a command to change the frame rate (operation S620: Y), the processor 130 identifies whether or not the identified frame rate corresponding to the received video and the frame rate of the display panel 120 are different from each other (operation S660).

When the identified frame rate corresponding to the received video and the frame rate of the display panel 120 are different from each other (operation S660: Y), the processor 130 may adjust frames configuring the received video and control the display panel to output the adjusted video (operation S670).

When the identified frame rate corresponding to the received video and the frame rate of the display panel 120 are the same (operation S660: N), the processor 130 may control the display panel 120 to output the received video (operation S680).

Hereinafter, embodiments in which the processor 130 adjusts frames configuring a received video and controls the display panel to output an adjusted video in a case where a user command is a command to fix a frame rate and an identified frame rate corresponding to the received video and a frame rate of the display panel 120 are different from each other will be described.

Figure 8:
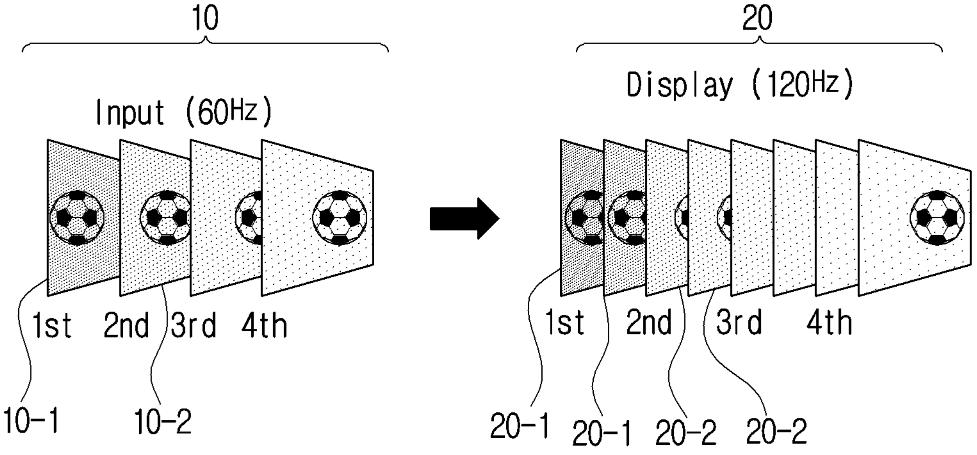
FIG. 8 is a view illustrating generating a frame according to an embodiment.

FIG. 8 is a view illustrating generating a frame according to an embodiment.

Referring to FIG. 8, the processor 130 according to an embodiment may generate a new frame between a plurality of frames configuring a received video 10 when a frame rate corresponding to the received video 10 is a first frame rate (for example, 60 fps) and a frame rate of the display panel 120 fixed according to a user command is a second frame rate (for example, 120 Hz). Here, the generated new frame may be referred to as an interpolation frame.

The processor 130 may control the display panel 120 to output an adjusted video 20 including the plurality of frames configuring the received video 10 and the generated new frame and corresponding to the received video 10.

According to an embodiment, the processor 130 may obtain the new frame, that is, the interpolation frame, based on various frame interpolation technologies according to the related art.

Referring to FIG. 8, the processor 130 according to an embodiment may obtain the new frame by repeating the previous frame between the respective frames configuring the received video 10. As an example, when a frame rate of the received video 10 is 60 fps, the processor 130 according to an embodiment may obtain the adjusted video 20 of 120 fps by repeating each of the plurality of frames configuring the video 10. Then, the processor 130 may control the display panel 120 to display the adjusted video 20. Meanwhile, specific numbers are only examples, and an embodiment is not limited thereto. For example, when a frame rate of the received video 10 is 30 fps, the processor 130 according to an embodiment may obtain the adjusted video 20 of 60 fps or 120 fps by repeating each of the plurality of frames configuring the video 10 based on the frame rate of the display panel 120.

In the above-described method of obtaining the new frame, that is, the interpolation frame by repeating each of the frames configuring the video 10 is described. For example, the processor 130 may control the display panel 120 to repeatedly provide a first output frame 20-1 of the adjusted video 20 corresponding to a first frame 10-1 of the received video 10. However, the method of obtaining the new frame by repeating the frame as described above is only an example, and the processor 130 may obtain the new frame and the adjusted video 20 including the new frame by various methods.

Figure 9:
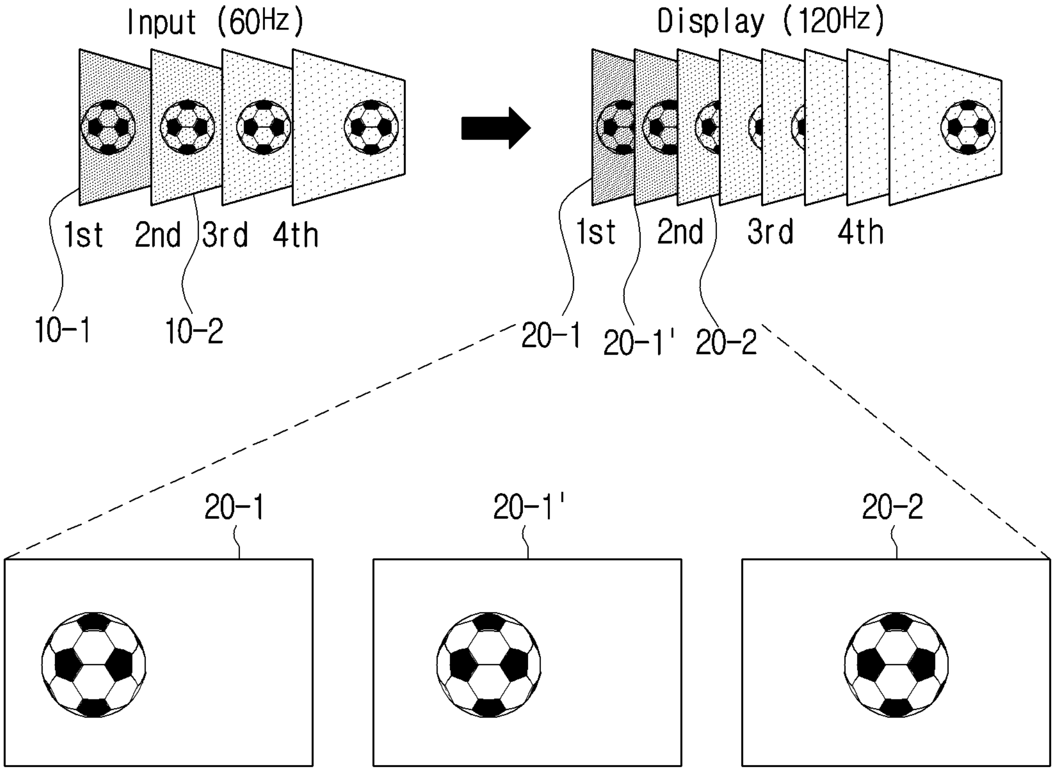
FIG. 9 is a view illustrating generating a frame according to an embodiment.

FIG. 9 is a view illustrating generating a frame according to an embodiment.

Referring to FIG. 9, the processor 130 may generate a new frame based on at least two of a plurality of frames configuring a received video 10. Here, the generated frame may be a frame generated based on motion information of an object included in at least two of the plurality of frames configuring the video 10.

As an example, the processor 130 may obtain a new output frame 20-1' based on a first frame 10-1 and a second frame 10-2 of the plurality of frames configuring the received video 10. Here, the new output frame 20-1' might not be the same as a first output frame 20-1 corresponding to the first frame 10-1 or a second output frame 20-2 corresponding to the second frame 10-2.

Here, the new output frame 20-1 may be a frame obtained by calculation based on motion information of an object included in each of the first frame 10-1 and the second frame 10-2. Here, the motion information may include a position of an object in a frame, a position and a form of the object in the previous frame, change amounts in a position and a form of the object in the next frame, and the like.

The processor 130 according to an embodiment may position the new output frame 20-1' between the first output frame 20-1 and the second output frame 20-2 within an adjusted video, and output the new output frame 20-1' after the previous frame (for example, the first output frame 20-1) is output and before the next frame (for example, the second output frame 20-2) is output. Meanwhile, as a method of obtaining the new frame according to an embodiment, various methods according to the related art such as fluid motion of AMD, Inc., and the like, may be used, in addition to the method described above.

FIG. 10 is a block diagram illustrating components of the display apparatus according to an embodiment in detail.

Referring to FIG. 10, the display apparatus 100 according to an embodiment may include the communication interface 110, the display panel 120, the processor 130, a panel driver 140, a memory 150 and a user Interface 160. However, the display apparatus 100 does not necessarily include all of the components described above. In addition, the display apparatus 100 may further include components such as an audio outputter, a power supply, and the like.

The display panel 120 may include a liquid crystal layer, a pixel electrode, a liquid crystal capacitor, a gate line, a data line, a backlight unit, and the like. The display panel 120 may express brightness of each pixel according to a luminance value identified through luminance information.

The processor 130 according to an embodiment may analyze the received video to obtain video processing delay information related to the processing of the received video, and identify the frame rate of the received video based on the video processing delay information, and adjust the setting value of the display panel so that the display panel operates at the identified frame rate.

The processor 130 according to an embodiment may perform at least one video correction processing on the received video, and then provide the video through the display panel 120. In this case, there is a risk that an input delay time and an input lag will occur depending on a time required from reception of the video until output of the video.

The processor 130 according to an embodiment may obtain video processing delay information related to processing (for example, video correction processing according the related art) of the received video. Then, the processor 130 may identify the frame rate of the video based on the video processing delay information. For example, the processor 130 may increase the frame rate of the display panel 120 in a case where a time required until the output of the received video exceeds a threshold time based on the video processing delay information. As an example, the processor 130 may increase the frame rate of the display panel 120 from 60 Hz to 120 Hz and output the received video.

Here, the video processing delay information may be determined based on at least one of type information of the received video, user interaction related information, or object information in the received video. For example, the type information of the video may include information on whether or not the received video corresponds to any one of movie contents, game contents, streaming contents, or image contents. However, the contents described above are only examples, and an embodiment is not limited thereto. For example, the type information of the video may include content type information classified in more detail. As an example, the type information of the video may include information on which genre in a game, such as a rhythm game, an FPS game, a fighting game, or the like, among the game contents the received video corresponds to. As another example, the type information of the video may include information on which genre in a movie, such as an action movie, a war movie, a science fiction movie, an animation, or the like, among the movie contents the received video corresponds to.

When it is identified that the received video is an FPS game content, the processor 130 according to an embodiment may obtain a delay time, that is, video processing delay information. Then, the processor 130 may change the frame rate of the display panel 120 when the delay time exceeds a threshold time based on the video processing delay information. For example, the processor 130 may increase the frame rate of the display panel 120 from 60 Hz to 120 Hz. For example, when it is identified that the delay time exceeds 100 ms based on the video processing delay information, the processor 130 may change the frame rate of the display panel 120 for a game to be smoothly played by the user.

As another example, when it is identified that the received video is a rhythm game content, the processor 130 may obtain a delay time, that is, video processing delay information. Then, the processor 130 may change the frame rate of the display panel 120 when it is identified that the delay time exceeds a threshold time, for example, 50 ms based on the video processing delay information. In the embodiment described above, specific numbers are only examples for convenience of explanation, and an embodiment is not limited thereto. For example, the processor 130 may receive the video processing delay information from an external server through the communication interface, identify whether or not to change the frame rate of the display panel 120 based on information on threshold times mapped to each of information on video types included in the received video processing delay information, and to what extent (for example, 120 Hz, 144 Hz, or the like) to change the frame rate.

As another example, the processor 130 may identify type information of the video, and identify a frame rate corresponding to the identified type information. Then, the processor 130 may drive the display panel 120 at the identified frame rate. For example, in a case of the FPS game content among the game contents, the display panel 120 may be set to be driven at 144 Hz, and the processor 130 may change the frame rate of the display panel 120 to 144 Hz when it is identified that the received video is the FPS game content through metadata of the received video or analysis of the received video. However, this is an example, and specific frame rates may be set for each of a plurality of content genres or specific frame rates may be set for only some content genres. For example, when a specific frame rate corresponding to a content genre of the received video is set, the processor 130 may drive the display panel 120 at the set frame rate, and when a specific frame rate is not set for a content genre of the received video, the processor 130 may drive the display panel 120 at a frame rate obtained based on metadata of the received video.

The processor 130 according to an embodiment may determine the video processing delay information based on object information in the video.

As an example, in a case where objects of whose number is a threshold number or more are identified within the received video or in a case where it is identified that a plurality of objects are changed within the video according to object movement information, the processor 130 may change the frame rate of the display panel 120 to smoothly provide the objects to the user. For example, in a case where an object in a frame included in the received video is rapidly changed or in a case where a plurality of objects are moved, the processor 130 may increase the frame rate of the display panel 120 to provide a smooth video to the user without a lag and a delay, and output the received video. Here, the object movement information may include information on a position change of each of objects included in the previous frame and a current frame, or the like.

For example, in a case where a content in which positions of each of the plurality of objects are changed when a frame is changed, such as a shooting game content, a sports game content, or the like, is identified, the processor 130 may change the frame rate of the display panel 120 to a threshold frame rate or more, and output the video (or the content).

Here, the threshold frame rate may refer to a frame rate for providing game contents, movie contents, or the like, to the user without a delay. For example, the threshold frame rate may be set to 120 Hz, but is not limited thereto.

As another example, the processor 130 may determine the video processing delay information based on the user interaction related information. For example, when it is identified that a user's interaction is input threshold times or more based on the user interaction related information, the processor 130 may change the frame rate of the display panel 120. Here, the user interaction related information may include a user's input, a screen manipulation command, a manipulation command for an object in the game contents in a case of the game contents, and the like. For example, in a case where the user's interaction is input threshold times or more, the processor 130 may increase the frame rate of the display panel 120 to smoothly provide a screen in which a plurality of interactions are reflected to the user.

As another example, in a case where fine adjustment of a specific object in the video is required based on the user interaction related information, the processor 130 may increase the frame rate of the display panel 120 so that afterimage or an overlay is not generated. For example, when a user interaction with a specific object such as a target, or the like, in the shooting game content is received and it is identified that the specific object is an object requiring fine adjustment, the processor 130 may increase the frame rate of the display panel 120 to minimize occurrence of the delay.

The panel driver 140 may provide a driving signal to the display panel 120. For example, the panel driver 140 may include a gate driver, a data driver, a gradation voltage generator, and a signal controller. Although the panel driver 140 is described as a separate component in the embodiment of FIG. 10, in an embodiment, the processor 130 may also serve as the panel driver 140. As an example, the panel driver 140 may drive the display panel 120 at a frame rate corresponding to the frame rate of the received video 10 based on the frame rate of the received video 10.

The memory 150 may be electrically connected to the processor 130 and may store data used according to embodiments. For example, the memory 150 may be implemented as an internal memory such as a read-only memory (ROM) (for example, an electrically erasable programmable read-only memory (EEPROM)), a random access memory (RAM), or the like, included in the processor 130 or be implemented as a memory separate from the processor 130.

The memory 150 may be implemented in a form of a memory embedded in the display apparatus 100 or be implemented in a form of a memory attachable to and detachable from the display apparatus 100, depending on a data storing purpose. For example, data for driving the display apparatus 100 may be stored in the memory embedded in the display apparatus 100, and data for an extension function of the display apparatus 100 may be stored in the memory attachable to and detachable from the display apparatus 100. In a case where the memory 150 is implemented as the memory embedded in the display apparatus 100, the memory 150 may be at least one of a volatile memory (for example, a dynamic random access memory (DRAM), a static RAM (SRAM), a synchronous dynamic RAM (SDRAM), or the like) or a non-volatile memory (for example, a onetime programmable read-only memory (OTPROM), a programmable ROM (PROM), an erasable programmable ROM (EPROM), an electrically erasable and programmable ROM (EEPROM), a mask ROM, a flash ROM, a flash memory (for example, a NAND flash, a NOR flash, or the like), a hard drive, or a solid state drive (SSD)).

In a case where the memory 150 is implemented as the memory attachable to and detachable from the display apparatus 100, the memory 150 may be a memory card (for example, a compact flash (CF), a secure digital (SD), a micro-SD, a mini-SD, an extreme digital (xD), a multi-media card (MMC), or the like), an external memory (for example, a USB memory) connectable to a USB port, or the like.

In particular, the memory 150 according to an embodiment may store information on a setting value required for the display panel 120 to be driven at a specific frame rate of a plurality of frame rates. For example, the memory 150 may store a setting value (for example, at least one of a DCC value, a liquid crystal charging timing, or luminance) required for the display panel 120 to be driven at a frame rate of 60 Hz. In addition, the memory 150 may store a setting value (for example, at least one of a DCC value, a liquid crystal charging timing, or luminance) required for the display panel 120 to be driven at a frame rate of 120 Hz. The information on the setting value may be in a look-up table form, but is not necessarily limited thereto. The information on the setting value may be stored in the memory 150 inside the display apparatus 100 or luminance information stored in an external server may be used. In this case, the communication interface 110 may communicate with the external server to receive the information on the setting value.

The user interface 160 may be implemented by a device such as a button, a touch pad, a mouse, and a keyboard or may be implemented by a touch screen, a remote control transmitter/receiver, or the like, capable of performing both of the display function described above and a manipulation input function. The remote control transmitter/receiver may receive a remote control signal from an external remote control device or transmit a remote control signal to the external remote control device through at least one of infrared communication, Bluetooth communication, or Wi-Fi communication.

An outputter outputs a sound signal. For example, the outputter may convert a digital sound signal processed by the processor 130 into an analog sound signal, and amplify and output the analog sound signal. For example, the outputter may include at least one speaker unit capable of outputting at least one channel, a D/A converter, an audio amplifier, and the like. According to an example, the outputter may be implemented to output various multi-channel sound signals. In this case, the processor 130 may control the outputter to enhancement-process an input sound signal to correspond to enhancement processing of the input video and then output the sound signal. For example, the processor 130 may converts an input 2-channel sound signal into a virtual multi-channel (for example, 5.1-channel) sound signal, recognize a position where the display apparatus 100 is put and process the input 2-channel sound signal as a stereoscopic sound signal optimized for a space, or provide an optimized sound signal according to a type (for example, a content genre) of input video.

The display apparatus 100 may further include a tuner and a demodulator, according to an implementation. The tuner may tune a channel selected by the user among radio frequency (RF) broadcasting signals received through an antenna or all pre-stored channels to receive an RF broadcasting signal. The demodulator may receive and demodulate a digital intermediate frequency (DIF) signal converted by the tuner and perform channel demodulation, or the like. According to an embodiment, an input video received through the tuner may be processed through the demodulator and be then provided to the processor 130 for video processing according to an embodiment.

The above-described embodiments may be applied to all electronic apparatuses capable of performing video processing, such as a video receiving apparatus such as a set-top box, a video processing apparatus, as well as the display apparatus.

Embodiments may be implemented in a computer or an apparatus similar to the computer using software, hardware, or a combination of software and hardware. In some cases, embodiments described in the disclosure may be implemented by a processor itself. According to a software implementation, embodiments such as procedures and functions described herein may be implemented by separate software modules. Each of the software modules may perform one or more functions and operations described in the disclosure.

Software (e.g., the program) containing one or more instructions for performing processing operations of the display apparatus 100 according to embodiments may be stored in a machine-readable (e.g., computer-readable) storage medium (e.g., internal memory) or external memory. The instructions stored in a non-transitory computer-readable medium cause a specific device to perform the processing operations of the display apparatus 100 according to embodiments when they are executed by a processor of the specific device.

The non-transitory computer-readable medium is not a medium that stores data for a while, such as a register, a cache, a memory, or the like, but means a medium that semi-permanently stores data and is readable by the device. Specific examples of the non-transitory computer-readable medium may include a compact disk (CD), a digital versatile disk (DVD), a hard disk, a Blu-ray disk, a USB, a memory card, a ROM, and the like.

While embodiments have been particularly shown and described with reference to the drawings, the embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. A display apparatus comprising:

a communication interface comprising a circuit and configured to receive a video;

a display panel configured to operate in one from among a first mode and a second mode, and output the video by being selectively driven at one from among a first frame rate and a second frame rate, respectively, the second frame rate having a frequency higher than a frequency of the first frame rate; and at least one processor configured to:

based on the video, an input frame rate of the video corresponding to the first frame rate, being received through the communication interface, identify an operation mode of the display panel from among the first mode and the second mode, based on the operation mode being identified as the first mode, control the display panel to output the video, by maintaining the input frame rate of the video at the first frame rate, and driving the display panel at the first frame rate, wherein the first mode is for minimizing a delay that occurs between an input and an output of the video, and based on the operation mode being identified as the second mode, control the display panel to output the video by changing the input frame rate of the video from the first frame rate to the second frame rate, and driving the display panel at the second frame rate, wherein the second mode is for changing the input frame rate of the video, and wherein the at least one processor is further configured to adjust a dynamic capacitance compensation (DCC) value of the display panel based on whether the display panel operates at the first frame rate or the second frame rate, and wherein a first DCC value corresponding to the first frame rate of the display panel is greater than a second DCC value corresponding to the second frame rate of the display panel.

2. The display apparatus as claimed in claim 1, wherein the at least one processor adjusts a liquid crystal charging timing of the display panel based on whether the display panel operates at the first frame rate or the second frame rate, and wherein a first liquid crystal charging timing corresponding to the first frame rate of the display panel is greater than and a second liquid crystal charging timing corresponding to the second frame rate of the display panel.

3. The display apparatus as claimed in claim 1, wherein the at least one processor is further configured to:

based on a mode of the display apparatus being changed from the first mode to the second mode, increase the DCC value and a liquid crystal charging timing based on a setting value corresponding to the first frame rate, and adjust a luminance of the display panel so that a gamma value of the display panel is maintained to be equal to a reference gamma value.

4. The display apparatus as claimed in claim 1, wherein the at least one processor is further configured to:

change a frame rate of the display panel based on a user command for changing the frame rate of the display panel, and drive the display panel, based on the user command.

5. The display apparatus as claimed in claim 4, wherein the at least one processor is further configured to:

control the display panel to display a user interface (UI) for changing the frame rate of the display panel, and adjust a setting value of the display panel so that the display panel operates at a frame rate corresponding to the user command input through the UI.

6. The display apparatus as claimed in claim 1, wherein the at least one processor is further configured to identify the input frame rate of the video as corresponding to the first frame rate based on metadata of the video.

7. The display apparatus as claimed in claim 1, wherein the at least one processor is further configured to:

analyze the video to obtain information related to the delay required to process the video, and identify the input frame rate of the video based on the information.

8. The display apparatus as claimed in claim 7, wherein the information is determined based on at least one of type information of the video, user interaction related information, or object information in the video.

9. The display apparatus of claim 1, wherein the processor identifies a frame rate of the input video at the communication interface and further receives a user input for a frame rate, and further determines whether the frame rate at the communication interfaces substantially matches the user input for a frame rate, and adjusts the display to output the user input for the frame rate based on the determination.

10. A control method of a display apparatus, the control method comprising:

based on a video being received, identifying an operation mode of a display panel from among a first mode and a second mode, an input frame rate of the video corresponding to a first frame rate among a plurality of frame rates of the display panel of the display apparatus, wherein the display panel is configured to operate in one from among the first mode and the second mode, by being selectively driven at one from among the first frame rate and a second frame rate, respectively, among the plurality of frame rates;

based on the operation mode being identified as the first mode, controlling the display panel to output the video, by maintaining the input frame rate of the video at the first frame rate, and driving the display panel at the first frame rate, wherein the first mode is for minimizing a delay that occurs between an input and an output of the video; and based on the operation mode being identified as the second mode, controlling the display panel to output the video by changing the input frame rate of the video from the first frame rate to the second frame rate, and driving the display panel at the second frame rate, wherein the second mode is for changing the input frame rate of the video, and wherein the second frame rate has a frequency higher than a frequency of the first frame rate, and wherein the control method further comprises adjusting a dynamic capacitance compensation (DCC) value of the display panel, based on whether the display operates at the first frame rate or the second frame rate, and wherein a first DCC value corresponding to the first frame rate of the display panel are greater than a second DCC value corresponding to the second frame rate of the display panel.

11. The control method as claimed in claim 10, further comprising:

adjusting a liquid crystal charging timing of the display panel based on whether the display panel operates at the first frame rate or the second frame rate, and wherein a first liquid crystal charging timing corresponding to the first frame rate is greater than second liquid crystal charging timing corresponding to the second frame rate of the display panel.

12. The control method as claimed in claim 10, further comprising:

based on a mode of the display apparatus being changed from the first mode to the second mode, increasing the DCC value and a liquid crystal charging timing based on a setting value corresponding to the first frame rate; and adjusting a luminance of the display panel so that a gamma value of the display panel is maintained to be equal to a reference gamma value.

13. The control method as claimed in claim 10, further comprising changing a frame rate of the display panel based on receiving a user command for changing the frame rate of the display panel.

14. The control method as claimed in claim 13, further comprising:

displaying a user interface (UI) for changing the frame rate of the display panel, and adjusting a setting value of the display panel so that the display panel operates at a frame rate corresponding to the user command input through the UI.

15. The control method as claimed in claim 10, further comprising identifying the input frame rate of the video as corresponding to the first frame rate based on metadata of the received video.

16. The control method as claimed in claim 10, further comprising:

analyzing the video to obtain information related to the delay required to process the video, and identifying the input frame rate of the video based on the information.

17. The control method as claimed in claim 16, wherein the information is determined based on at least one of type information of the video, user interaction related information, or object information in the video.

18. A display apparatus comprising:

a communication interface comprising a circuit and configured to receive a video;

a display panel configured to operate in one from among a first mode and a second mode, and output the video by being selectively driven at one from among a first frame rate and a second frame rate having a frequency higher than a frequency of the first frame rate, wherein an input frame rate of the received video corresponds to the one from among the first frame rate and the second frame rate; and at least one processor configured to:

identify an operation mode of the display panel from among the first mode and the second mode;

based on the operation mode being identified as a first operation mode, control the display panel to output the video, by driving the display panel at the one from among the first frame rate and the second frame rate that corresponds to the input frame rate of the video; and based on the operation mode being identified as a second operation mode, control the display panel to output the video by driving the display panel at the second frame rate regardless of whether the input frame rate of the video corresponds to the first frame rate or corresponds to the second frame rate, wherein the at least one processor is further configured to:

when the input frame rate corresponds to the first frame rate, maintain the input frame rate in the first operation mode and change the input frame rate to the second frame rate in the second mode, and when the input frame rate corresponds to the second frame rate, maintain the input frame rate in the first operation mode and in the second operation mode, wherein the at least one processor is further configured to adjust at least one of a dynamic capacitance compensation (DCC) value of the display panel based on whether the display panel operates at the first frame rate or the second frame rate, and wherein a first DCC value corresponding to the first frame rate of the display panel is greater than a second DCC value corresponding to the second frame rate of the display panel.

* * * * *